(12) United States Patent
Kwak (10) Patent No.: US 9,893,345 B2
(45) Date of Patent: Feb. 13, 2018

(54) RECHARGEABLE BATTERY

(71) Applicant: SAMSUNG SDI CO., LTD., Yongin-si, Gyeonggi-do (KR)

(72) Inventor: Seungho Kwak, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 331 days.

(21) Appl. No.: 14/560,336

(22) Filed: Dec. 4, 2014

(65) Prior Publication Data

US 2015/0295222 A1 Oct. 15, 2015

(30) Foreign Application Priority Data

Apr. 11, 2014 (KR) .................. 10-2014-0043747

(51) Int. Cl.
*H01M 2/34* (2006.01)
*H01M 2/04* (2006.01)

(52) U.S. Cl.
CPC ......... *H01M 2/345* (2013.01); *H01M 2/0473* (2013.01); *H01M 2200/20* (2013.01)

(58) Field of Classification Search
CPC .................. H01M 2200/20; H01M 2/345
USPC ........................................................ 429/61
See application file for complete search history.

(56) References Cited

U.S. PATENT DOCUMENTS 6,468,692 B1 * 10/2002 Nemoto ................ H01M 2/08 429/171
2011/0052949 A1 3/2011 Byun et al.
2011/0183193 A1 7/2011 Byun et al.
2012/0183818 A1 7/2012 Byun et al.
2012/0237802 A1 9/2012 Byun et al.
2012/0315515 A1 * 12/2012 Guen .................. H01M 2/0473 429/56
2014/0079966 A1 3/2014 Byun et al.
2014/0205863 A1 7/2014 Byun et al.
(Continued)

FOREIGN PATENT DOCUMENTS

KR        10-1042808        6/2011
KR      10-2012-0104911     9/2012
KR      10-2014-0094891     7/2014

OTHER PUBLICATIONS

EPO Search Report dated Sep. 14, 2015, for corresponding European Patent application 15156240.2, (4 pages).

*Primary Examiner* — James Lee
(74) *Attorney, Agent, or Firm* — Lewis Roca Rothgerber Christie LLP (57) ABSTRACT

A rechargeable battery is provided, which includes a protection layer with an inversion plate, thereby improving safety by preventing the inversion plate from malfunctioning. In one example embodiment, the rechargeable battery includes an electrode assembly including a first electrode plate, a second electrode plate, and a separator disposed between the first electrode plate and the second electrode plate, a case accommodating the electrode assembly, and a cap assembly coupled to the case, wherein the cap assembly comprises a cap plate sealing the case and having a short-circuit opening, an inversion plate installed in the short-circuit opening of the cap plate, and a connection plate installed to cover the short-circuit opening of the cap plate, and a protection layer having a higher melting point than the cap plate is formed under the inversion plate.

9 Claims, 6 Drawing Sheets

(56) References Cited

U.S. PATENT DOCUMENTS

2014/0302359 A1* 10/2014 Huang ................ H01M 2/345
                                                                            429/61

* cited by examiner

RECHARGEABLE BATTERY

CROSS-REFERENCE TO RELATED APPLICATION

This application claims priority to and the benefit of Korean Patent Application No. 10-2014-0043747 filed on Apr. 11, 2014, the content of which is incorporated herein by reference in its entirety.

BACKGROUND

1. Field

Aspects of the present invention relate to a rechargeable battery.

2. Description of the Related Art

A rechargeable battery can be repeatedly charged and discharged, unlike a primary battery that should not be recharged. A low-capacity rechargeable battery packaged in the form of a pack of a battery cell is typically used for a small portable electronic device such as a mobile phone or a camcorder. A large-capacity rechargeable battery having several tens of battery packs connected to each other is widely used as a power supply for driving a motor of a hybrid vehicle and the like.

The rechargeable battery is manufactured in various shapes, and representative shapes thereof may include a cylindrical shape and a prismatic shape. The rechargeable battery is generally configured such that an electrode assembly which is formed by interposing a separator serving as an insulator between positive and negative electrodes, and an electrolyte solution are housed in a case, and a cap assembly is installed in the case.

If excessive heat is generated or an electrolytic solution is decomposed in a rechargeable battery, an internal pressure may be increased, and there is a risk of ignition or explosion. Accordingly, a rechargeable battery configured to improve safety is required.

SUMMARY

An aspect of an embodiment of the present invention has been made in view of the above problems, and aspects of embodiments of the present invention are directed toward a rechargeable battery that is provided to include a protection layer with an inversion plate, thereby improving safety by preventing or protecting the inversion plate from malfunctioning.

According to an embodiment of the present invention, there is provided a rechargeable battery including an electrode assembly including a first electrode plate, a second electrode plate, and a separator disposed between the first electrode plate and the second electrode plate, a case accommodating the electrode assembly, and a cap assembly coupled to the case, wherein the cap assembly includes a cap plate sealing the case and having a short-circuit hole, an inversion plate installed in a short-circuit hole or opening of the cap plate, and a connection plate installed to cover the short-circuit hole of the cap plate, and a protection layer having a higher melting point than the cap plate is formed under the inversion plate.

In the rechargeable battery according to the embodiment of the present invention, the protection layer having a relatively high melting point is formed in the inversion plate, thereby making the inversion plate keep operating even when a short-circuit occurs.

Therefore, the rechargeable battery according to the embodiment of the present invention can improve the safety by preventing the inversion plate from malfunctioning by closing a hole generated in the inversion plate due to occurrence of a short-circuit and making the inversion plate continuously operate.

Additional aspects and/or advantages of embodiments of the invention will be set forth in part in the description which follows and in part will be obvious from the description or may be learned by practice of the invention.

BRIEF DESCRIPTION OF THE DRAWINGS

The aspects, features and advantages of the present invention will be more apparent from the following detailed description in conjunction with the accompanying drawings, in which.

DETAILED DESCRIPTION

Hereinafter, examples of embodiments of the invention will be described in detail with reference to the accompanying drawings such that they can easily be made and used by those skilled in the art.

Figure 1:
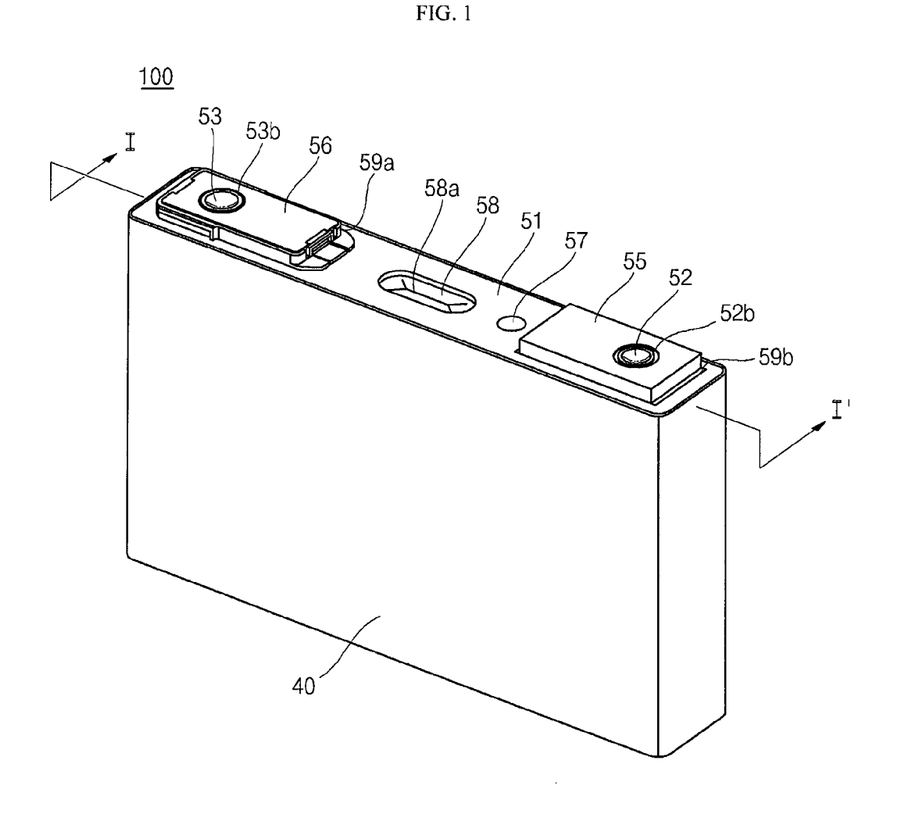
FIG. 1 is a perspective view of a rechargeable battery according to an embodiment of the present invention.
Figure 2:
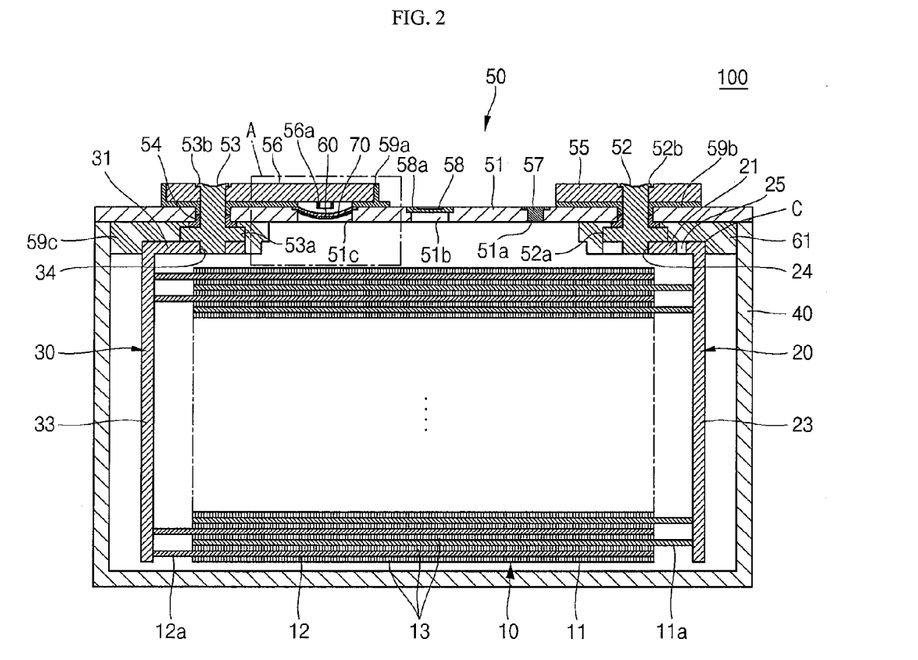
FIG. 2 is a cross-sectional view of the rechargeable battery taken along the line I-I' of FIG. 1.
Figure 3A:
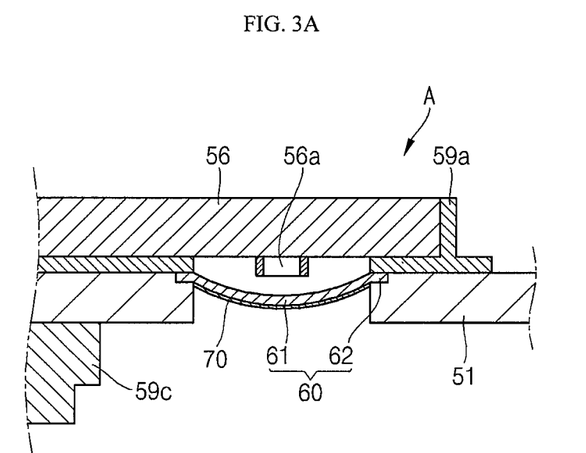
FIG. 3A is an enlarged cross-sectional view illustrating a portion 'A' of FIG. 2
Figure 3B:
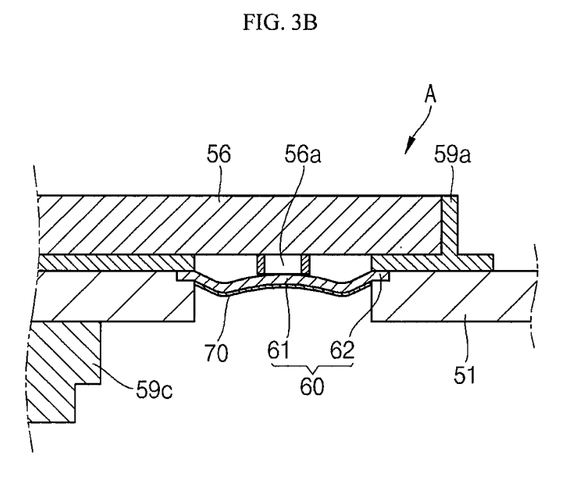
FIG. 3B is a cross-sectional view illustrating a case where an inversion plate shown in FIG. 3A makes contact with a terminal plate.
Figure 4A:
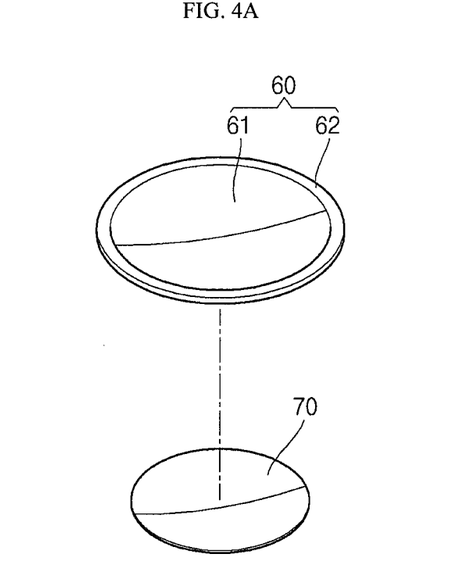
FIG. 4A is a perspective view illustrating an inversion plate and a protection layer shown in FIG. 2
Figure 4B:
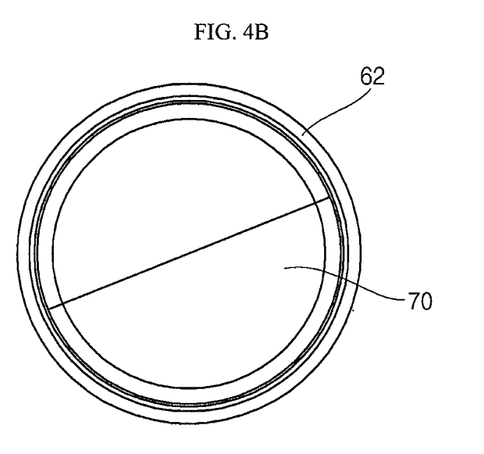
FIG. 4B is a rear view illustrating a bottom portion of the inversion plate having a protection layer of FIG. 4A.
Figure 5:
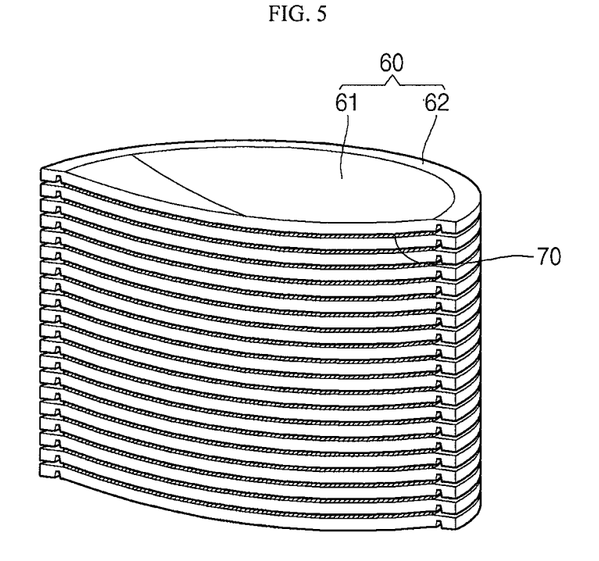
FIG. 5 is a cross-sectional view illustrating a state in which the inversion plate shown in FIG. 4B is stacked.

FIG. 1 is a perspective view of a rechargeable battery according to an embodiment of the present invention, FIG. 2 is a cross-sectional view of the rechargeable battery taken along the line I-I' of FIG. 1, FIG. 3A is an enlarged cross-sectional view illustrating a portion 'A' of FIG. 2, FIG. 3B is a cross-sectional view illustrating a case where an inversion plate shown in FIG. 3A makes contact with a terminal plate, FIG. 4A is a perspective view illustrating an inversion plate and a protection layer shown in FIG. 2, FIG. 4B is a rear view illustrating a bottom portion of the inversion plate having a protection layer of FIG. 4A, and FIG. 5 is a cross-sectional view illustrating a state in which the inversion plate shown in FIG. 4B is stacked.

Referring to FIGS. 1 and 2, the rechargeable battery 100 according to an embodiment of the present invention includes an electrode assembly 10, a first collector plate 20, a second collector plate 30, a case 40, and a cap assembly 50.

The electrode assembly 10 may be formed by winding or laminating a stacked structure including a first electrode plate 11, a separator 13, and a second electrode plate 12. In an implementation, the first electrode plate 11 may serve as a positive electrode and the second electrode plate 12 may serve as a negative electrode.

The first electrode plate 11 may be formed by coating a first electrode active material (made of, e.g., a transition metal oxide) on a first electrode collector (made of a metallic foil, e.g. aluminum foil) and may include a first electrode uncoated portion 11a that is not coated with the first electrode active material. The first electrode uncoated portion 11a may become a path of current flow between the first electrode plate 11 and an outside of the first electrode plate 11. In certain embodiments of the present invention, the material of the first electrode plate 11 is not limited to those listed herein.

The second electrode plate 12 may be formed by coating a second electrode active material (made of, e.g., graphite or a carbon material) on a second electrode collector (made of a metallic foil, e.g., copper or nickel) and may include a second electrode uncoated region or portion 12a that is not coated with the second electrode active material. The second electrode uncoated portion 12a may become a path of current flow between the second electrode plate 12 and an outside of the second electrode plate 12. In certain embodiments of the present invention, the material of the second electrode plate 12 is not limited to those listed herein.

The first electrode plate 11 and the second electrode plate 12 may have different polarities. That is to say, the first electrode plate 11 may serve as a negative electrode and the second electrode plate 12 may serve as a positive electrode.

The separator 13 may prevent an electric short between the first electrode plate 11 and the second electrode plate 12 and may allow only lithium ions to pass. The separator 13 may be formed from, e.g., polyethylene (PE), polypropylene (PP) or a composite film of polyethylene (PE) and polypropylene (PP). The material of the separator 13 is not limited to those listed herein.

A first collector plate 20 and a second collector plate 30, which are electrically connected to the first electrode plate 11 and the second electrode plate 12, respectively, may be coupled to (e.g., connected with or to) opposite ends of the electrode assembly 10.

The first collector plate 20 may be made of a conductive material, such as aluminum, and may make contact with the first electrode uncoated portion 11a protruding to one end of the electrode assembly 10 to be electrically coupled to or electrically connected with (e.g., connected to) the first electrode plate 11. The first collector plate 20 may include a first connection part 21, a first extension part 23, a first terminal hole or opening 24 and a fuse part 25.

The first connection part 21 is installed between a top portion of the electrode assembly 10 and a bottom portion of the cap assembly 50 and is shaped as a plate. Here, the first terminal hole 24 and the fuse part 25 are formed in the first connection part 21.

The first extension part 23 is bent with respect to the first connection part 21, extends from an end of the first connection part 21 and is shaped as a plate substantially contacting the first electrode uncoated portion 11a. Here, assuming that a corner at which the first connection part 21 and the first extension part 23 meet is denoted by reference character 'C', the first connection part 21 and the first extension part 23 may be perpendicular to each other about the corner C.

The first terminal hole 24 is formed at one side of the first connection part 21 and provides for a space in the first connection part 21, into which a first electrode terminal 52 of the cap assembly 50 is fitted and coupled.

The fuse part 25 is formed on the top portion of the electrode assembly 10 so as not to make contact with an electrolytic solution, which is for the purpose of preventing the electrolytic solution from igniting due to heat generated from the fuse part 25. Here, the fuse part 25 (and/or an opening for housing the fuse part 25) is formed at a region of the first connection part 21 adjacent to the corner C so as not to overlap with the first electrode terminal 52 coupled to the first terminal hole 24. The fuse part 25 may be melted or softened due to heat generated by a large amount of current flowing due to a short circuit occurring to the rechargeable battery 100, thereby functioning as a fuse that blocks the flow of current. Here, the short circuit may be caused due to a contact between the inversion plate 60 and the second terminal plate 56 when heat is generated due to over-charge of the rechargeable battery 100 and an electrolytic solution is decomposed to make the internal pressure of the rechargeable battery 100 exceed a preset pressure. Accordingly, the fuse part 25 is melted due to a short circuit during over-charge, and blocks the flow of current, thereby interrupting charging or discharging of the rechargeable battery 100 before the rechargeable battery 100 comes to a dangerous situation, such as ignition or explosion.

The second collector plate 30 may be made of a conductive material, such as nickel or copper and may make contact with the second electrode uncoated portion 12a protruding to the other end of the electrode assembly 10 to then be electrically connected to the second electrode plate 12. The second collector plate 30 may include a second connection part 31, a second extension part 33 and a second terminal hole 34.

The second collector plate 30 may not include a fuse part corresponding to the fuse part 25 of the first collector plate 20 shown in FIG. 2 because the first collector plate 20 of the embodiment of the present invention includes the fuse part 25 functioning as a fuse. In addition, the first collector plate 20 made of, for example, aluminum, has a lower melting point than the second collector plate 30 made of, for example, nickel or copper, thereby more easily implementing the fuse function.

The case 40 may be made of a conductive metal, such as aluminum, an aluminum alloy, or nickel plated steel, and may have a substantially hexahedral shape having an opening through which the electrode assembly 10, the first collector plate 20, and the second collector plate 30 are inserted and arranged. Although the opening is not illustrated in FIG. 2, the case 40 and the cap assembly 50 of the present embodiment are shown in an assembled state. Thus, the peripheral portion of the cap assembly 50 substantially corresponds to the opening in the case 40. Meanwhile, the interior surface of the case 40 is insulated, so that the case 40 is electrically insulated from the electrode assembly 10, the first collector plate 20, the second collector plate 30 and the cap assembly 50. Here, the case 40 may have a polarity, so that it functions as a positive electrode, for example. In addition, the case 40 may include an electrolytic solution containing a carbonate-based solvent exemplified by dimethyl carbonate (DMC), diethyl carbonate (DEC), dipropyl carbonate (DPC), methylpropyl carbonate (MPC), ethylpropyl carbonate (EPC), methylethyl carbonate (MEC) ethylene carbonate (EC), propylene carbonate (PC), butylene carbonate (BC), and so on, but not limited thereto.

The cap assembly 50 is coupled to the case 40. In more detail, the cap assembly 50 includes a cap plate 51, a first electrode terminal 52, a second electrode terminal 53, a gasket 54, a first terminal plate 55, and a second terminal plate 56. In addition, the cap assembly 50 may further include a plug 57, a vent plate 58, an upper insulating member 59a, a connecting plate 59b, an inversion plate 60, a lower insulating member 63, and a protection layer 70.

The cap plate 51 seals the opening of the case 40 and may be made of the same material as the case 40. In the present embodiment, the cap plate 51 may have the same polarity as the case 40.

The first electrode terminal 52 penetrates through the cap plate 51 at one side of the cap plate 51 and is electrically coupled to the first collector plate 20. The first electrode terminal 52 may have a pillar shape. An upper pillar exposed to an upper portion of the cap plate 51 is coupled to the first terminal plate 55 by riveting and has a protrusion part 52b formed thereat to prevent the first electrode terminal 52 from being dislodged from the cap plate 51. A lower pillar positioned below the cap plate 51 has a flange 52a formed thereat to prevent the first electrode terminal 52 from being dislodged from the cap plate 51. A portion of the first electrode terminal 52 positioned at a lower portion of the flange 52a is fitted into the first terminal hole 24 of the first collector plate 20. Here, the first electrode terminal 52 may be electrically coupled to the cap plate 51.

The second electrode terminal 53 penetrates through the cap plate 51 at the other side of the cap plate 51, and is electrically coupled to the second collector plate 30. Since the second electrode terminal 53 has substantially the same shape as the first electrode terminal 52, a description thereof will not be repeated. However, the second electrode terminal 53 may be electrically insulated from the cap plate 51.

The gasket 54 is formed of an insulating material and is located between the first electrode terminal 52 and the cap plate 51 and between the second electrode terminal 53 and the cap plate 51 to seal respective gaps between the cap plate 51 and each of the first and second electrode terminals 52 and 53. The gasket 54 prevents permeation of external moisture into the rechargeable battery 100 or leakage of electrolyte from the inside of the rechargeable battery 100.

The first terminal plate 55 is coupled to the upper pillar of the first electrode terminal 52 by riveting to fix the first electrode terminal 52 with the cap plate 51.

The second terminal plate 56 is coupled to the upper pillar of the second electrode terminal 53 by riveting to fix the second electrode terminal 53 with the cap plate 51. The second terminal plate 56 is formed to allow the second electrode terminal 53 to be fitted thereinto from an exterior side spaced apart from the cap plate 51, that is, above the upper insulating member 59a and extends to cover a short-circuit hole or opening 51c. The second terminal plate 56 is electrically connected to the second electrode terminal 53. In addition, the second terminal plate 56 has a protrusion part 56a located to correspond to a round part 61 of the inversion plate 60. The protrusion part 56a is formed to protrude toward the inversion plate 60. In addition, the protrusion part 56a has a smaller diameter than the round part 61 of the inversion plate 60. The protrusion part 56a may be shaped as a hollow cylinder, but the shape of the protrusion part 56a is not limited thereto. The second terminal plate 56 causes a short circuit due to a contact with the inversion plate 60 that upwardly convexly protrudes when the internal pressure of the rechargeable battery 100 exceeds a preset pressure due to a high-voltage disconnection occurring in a state in which it is connected to an external battery or heat generated by over-charge conditions or electrolyte decomposition. If the short circuit is caused to the rechargeable battery 100 by the second terminal plate 56, a large amount of current flows in the rechargeable battery 100 and heat is generated. In this case, the fuse part 25 functions as a fuse, thereby improving the safety of the rechargeable battery 100.

The plug 57 seals an electrolyte injection hole 51a of the cap plate 51. The vent plate 58 is installed in a vent hole 51b of the cap plate 51 and has a notch 58a formed to be opened at a set or predetermined pressure.

The upper insulating member 59a is formed to be fitted between the second electrode terminal 53 and the cap plate 51 and makes tight contact with the cap plate 51 and the gasket 54. The upper insulating member 59a insulates the second electrode terminal 53 and the cap plate 51 from each other.

The connecting plate 59b is formed to be fitted between the first electrode terminal 52 and the cap plate 51 and makes tight contact with the cap plate 51 and the gasket 54 through a nut. The connecting plate 59b electrically connects the first electrode terminal 52 and the cap plate 51 to each other.

The lower insulating member 59c is formed between the cap plate 51 and each of the first collector plate 20 and the second collector plate 30 and prevents an unnecessary short circuit from occurring therebetween.

The inversion plate 60 is installed in the short-circuit hole or opening 51c of the cap plate 51 between the upper insulating member 59a and the cap plate 51 by welding. The inversion plate 60 includes a downwardly convex round part 61 (facing the inside of the case, that is, in a direction toward the electrode assembly) and a flange part 62 fixed to the cap plate 51.

The inversion plate 60 may be inverted to then upwardly convexly protrude when the internal pressure of the rechargeable battery 100 exceeds a preset pressure due to a high-voltage disconnection occurring in a state in which it is connected to an external battery or heat generated by over-charge conditions or electrolyte decomposition. The inversion plate 60 is inverted to be brought into contact with the protrusion part 56a of the second terminal plate 56, thereby causing a short circuit. The fuse part 25 is broken by the short circuit, thereby interrupting charging or discharging of the rechargeable battery 100 before the rechargeable battery 100 comes to a dangerous situation, such as ignition or explosion. That is, the inversion plate 60 causes an internal short circuit to the rechargeable battery 100 to melt the fuse part 25 in order to block the flow of current, thereby increasing the safety of the rechargeable battery 100. Therefore, in order to prevent the rechargeable battery 100 from being stably charged or discharged when a short circuit is generated in the rechargeable battery 100, a contact between the inversion plate 60 and the second terminal plate 56 should be maintained before the fuse part 25 is melted. Here, the inversion plate 60 and the second terminal plate 56 are maintained at a line contacting state or a point contacting state.

Meanwhile, the inversion plate 60 and the cap plate 51 have the same polarity. The inversion plate 60 may be made of aluminum, but not limited thereto.

As shown in FIG. 5, multiple inversion plates 60 are stacked for storage before they are applied to an automated process for assembling the rechargeable battery 100. However, friction between the stacked inversion plates 60 may occur, resulting in scratches on surfaces of the stacked inversion plates 60. Accordingly, when heat is generated due to over-charge of the rechargeable battery 100 and an electrolytic solution is decomposed to make the internal pressure of the rechargeable battery 100 exceed a preset pressure, each of the inversion plates 60 and the second terminal plate 56 are brought into contact with each other. In this case, the inversion plates 60 may not be properly inverted due to the scratches. Alternatively, gases generated in the rechargeable battery 100 may be exhausted through crevices of the scratches, thereby reducing or preventing the inversion plates 60 from being further inverted. Therefore, the contact between the inversion plate 60 and the second terminal plate 56 may not be maintained. In the present invention, a protection layer 70 is formed under each of the inversion plates 60, thereby minimizing friction between the stacked inversion plates 60 and ultimately preventing scratches from being generated on the inversion plates 60.

In addition, when contact resistance between the inversion plate 60 and the protrusion part 56a of the second terminal plate 56 is higher than the resistance of the fuse part 25, the inversion plate 60 may malfunction, so that it cannot completely break the fuse part 25, thereby causing damages to the inversion plate 60 and the second terminal plate 56. Here, even when the inversion plate 60 is damaged, the fuse part 25 can be broken just by maintaining the contact between the inversion plate 60 and the protrusion part 56a of the second terminal plate 56. However, since the gases generated in the rechargeable battery 100 are exhausted to the outside of the case 40 through damages to parts of the inversion plate 60, the inversion plate 60 may not be further inverted. Consequently, when malfunctioning occurs to the inversion plate 60, the safety of the rechargeable battery 100 may be impaired. In the present invention, the inverting operation of the inversion plate 60 can be maintained by covering the damaged parts of the inversion plate 60 by forming the protection layer 70 under the inversion plate 60 even when the inversion plate 60 is partially damaged.

The protection layer 70 is formed on one surface of the inversion plate 60. That is, the protection layer 70 is formed to entirely surround and/or cover a bottom surface of the round part 61 of the inversion plate 60. The protection layer 70 is formed by adhering or coating an appropriate material to the bottom surface of the round part 61. The protection layer 70 is made of a material having a higher melting point than the inversion plate 60. In the present invention, since the protection layer 70 is formed of a material having a higher melting point than the inversion plate 60, the damaged parts of the inversion plate 60 are covered until the fuse part 25 is broken. In addition, the protection layer 70 is made of a material not causing a chemical reaction when it is brought into contact with an electrolytic solution contained in the case 40. That is, when the inversion plate 60 is made of aluminum having a melting point of approximately or about 600° C., the protection layer 70 may have a melting point of approximately or about 600° C. or higher and may be made of a material not reacting with the electrolytic solution. In one embodiment, the protection layer 70 may be made of polyimide (PI). The PI is a resin having high heat resistance and a good electric insulating property and has a melting point of approximately 700° C. In addition, the PI is a material that does not react with the electrolytic solution contained in the case 40. Therefore, the protection layer 70 having a higher melting point than the inversion plate 60 is formed in the inversion plate 60, thereby allowing the inversion plate 60 to be continuously inverted when a short circuit occurs to the rechargeable battery 100 of the present invention.

Meanwhile, in the present invention, the protection layer 70 made of PI is exemplified, but aspects of the present invention are not limited thereto. Any material can be used for forming the protection layer 70 as long as it has a higher melting point than the inversion plate 60 and does not react with the electrolytic solution contained in the case 40.

Next, a rechargeable battery according to another embodiment of the present invention will now be described with reference to FIGS. 6 to 8.

Figure 6:
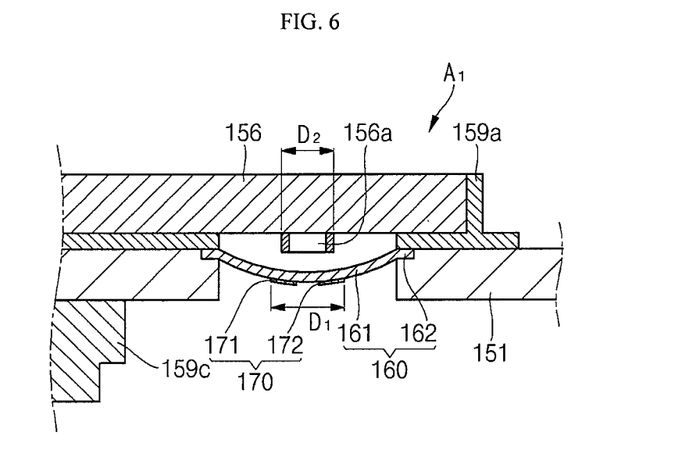
FIG. 6 is an enlarged cross-sectional view illustrating a portion of a rechargeable battery according to another embodiment of the present invention, corresponding to the portion 'A' of FIG. 2.

FIG. 6 is an enlarged cross-sectional view illustrating a portion of a rechargeable battery according to another embodiment of the present invention, corresponding to the portion 'A' of FIG. 2. FIG. 7 is an enlarged cross-sectional view illustrating a portion of a rechargeable battery according to still another embodiment of the present invention, corresponding to the portion 'A' of FIG. 2, and FIG. 8 is an enlarged cross-sectional view illustrating a portion of a rechargeable battery according to still another embodiment of the present invention, corresponding to the portion 'A' of FIG. 2.

The rechargeable battery 100 according to another embodiment of the present invention is substantially the same with the rechargeable battery 100 shown in FIG. 2 in view of configuration and functions, except for a shape of a protection layer 70 formed on a bottom surface of an inversion plate 60. Accordingly, in the rechargeable battery 100 according to another embodiment of the present invention, descriptions of the same components as those of the rechargeable battery 100 shown in FIG. 2 will not be repeated, and the following description will focus on the protection layer 70 formed on the bottom surface of the inversion plate 60.

Referring to FIG. 6, the protection layer 170 is shaped to correspond to a protrusion part 156a of a second terminal plate 156. In more detail, the protection layer 170 is formed on the bottom surface of the inversion plate 160 to have a shape corresponding to a shape of the protrusion part 156a of the second terminal plate 156, that is, a circular ring shape. The protection layer 170 covers the inversion plate 160 substantially contacting the protrusion part 156a of the second terminal plate 156. Here, an outer diameter D2 of the protrusion part 156a of the second terminal plate 156 is in one embodiment smaller than an outer diameter D1 of the circular ring-shaped protection layer 170 (that is, an outer side distance between a left-side protection layer 171 and a right-side protection layer 172 on a cross section of the protection layer 170). In addition, in order to cover a region of the inversion plate 160 contacting the protrusion part 156a of the second terminal plate 156, an inner diameter of the protrusion part 156a of the second terminal plate 156 is in one embodiment larger than that of the protection layer 170. In the present embodiment, the protection layer 170 shaped to correspond to the protrusion part 156a of the second terminal plate 156 making contact with the inversion plate 160 is formed on the bottom surface of the inversion plate 160 to cover the region of the inversion plate 160 contacting the protrusion part 156a of the second terminal plate 156, thereby maintaining the inverting operation of the inversion plate 160.

Figure 7:
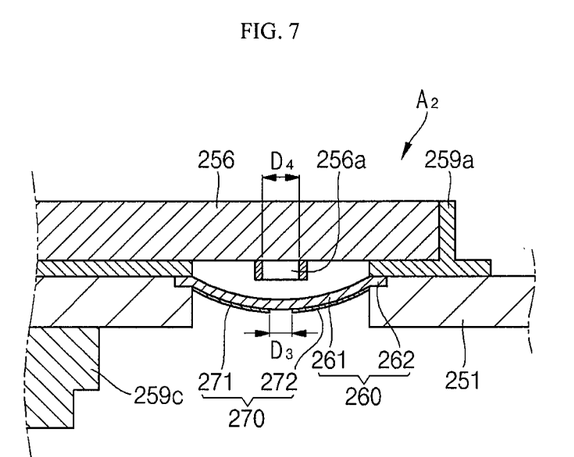
FIG. 7 is an enlarged cross-sectional view illustrating a portion of a rechargeable battery according to still another embodiment of the present invention, corresponding to the portion 'A' of FIG. 2.

Referring to FIG. 7, a protection layer 270 is formed only on a region except for a central region of a bottom surface of an inversion plate 260. In more detail, the protection layer 270 is formed only on a region, except for a region of the bottom surface of the inversion plate 260 having a smaller inner diameter D3 than an inner diameter D4 of the protrusion part 256a of the second terminal plate 256. That is, the protection layer 270 is shaped as a circular ring having a relatively large width to be formed only on a region of the bottom surface of the inversion plate 260, where an inner diameter of the region is greater than or equal to that of the protrusion part 256a of the second terminal plate 256. In the protection layer 270 according to the present embodiment, the inversion plate 260 may be formed to have a circular ring shape. The protection layer 270 covers the region except for the central region of the bottom surface of the inversion plate 260, the central region not making contact or overlap with the protrusion part 256a of the second terminal plate 256. When the internal pressure of the rechargeable battery 100 exceeds a preset pressure due to a high-voltage disconnection occurring in a state in which it is connected to an external battery or heat generated by over-charge conditions or electrolyte decomposition, the central region of the inversion plate 260 is pushed by the internal gases, thereby easily performing the inverting operation of the inversion plate 260. In addition, the protection layer 270 covers the region of the inversion plate 260 making contact with the protrusion part 256a of the second terminal plate 256 (that is, the region except for the central region by forming the protection layer 270 on the region except for the central region), thereby maintaining the inverting operation of the inversion plate 260.

Figure 8:
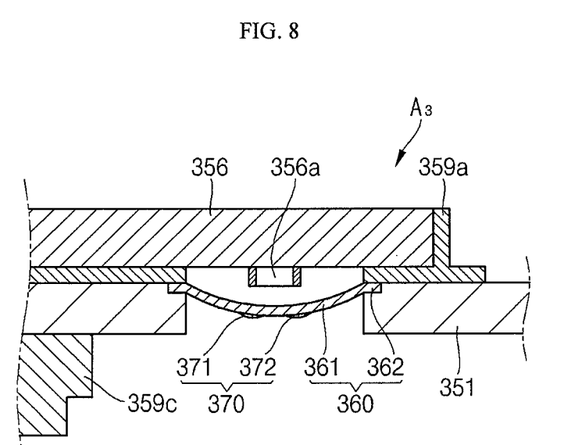
FIG. 8 is an enlarged cross-sectional view illustrating a portion of a rechargeable battery according to still another embodiment of the present invention, corresponding to the portion 'A' of FIG. 2.

Referring to FIG. 8, a protection layer 370 is formed on a region of a bottom surface of an inversion plate 360 shaped to correspond to a protrusion part 356a of the second terminal plate 356 more thickly than in a peripheral region of the region of the bottom surface of the inversion plate 360. In more detail, the protection layer 370 is formed on the region of the bottom surface of the inversion plate 360 shaped to correspond to the protrusion part 356a of the second terminal plate 356 more thickly than in other peripheral regions. The protection layer 370 covers the inversion plate 360 substantially contacting the protrusion part 356a of the second terminal plate 356. In the present embodiment, the protection layer 370 that is thicker than its peripheral region is formed on the region of the bottom surface of the inversion plate 360 shaped to correspond to the protrusion part 356a of the second terminal plate 356 to cover the region of the inversion plate 360 making contact with the protrusion part 356a of the second terminal plate 356, thereby maintaining the inverting operation of the inversion plate 360.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A rechargeable battery comprising:
an electrode assembly comprising a first electrode plate, a second electrode plate, and a separator disposed between the first electrode plate and the second electrode plate;
a case accommodating the electrode assembly; and
a cap assembly coupled to the case,
wherein the cap assembly comprises a cap plate sealing the case and having a short-circuit opening, an inversion plate installed in the short-circuit opening of the cap plate, and a connection plate installed to cover the short-circuit opening of the cap plate, and a protection layer having a higher melting point than the cap plate is attached under the inversion plate,
wherein the inversion plate comprises a downwardly convex around part convexly extending toward the electrode assembly and a flange part fixed to the cap plate the downwardly convex around part of the inversion plate being deformable to be brought into contact with the connection plate when an internal pressure of the case exceeds a preset pressure, and
wherein the protection layer is made of polyimide (PI).

2. The rechargeable battery of claim 1, wherein the protection layer is made of a material configured to not cause a chemical reaction when it is brought into contact with an electrolytic solution contained in the case.

3. The rechargeable battery of claim 1, wherein the connection plate has a protrusion part located to correspond to the inversion plate.

4. The rechargeable battery of claim 3, wherein the protrusion part is formed to face the inversion plate.

5. The rechargeable battery of claim 3, wherein the protection layer is shaped to correspond to the protrusion part.

6. The rechargeable battery of claim 3, wherein the protrusion part has a smaller outer diameter than that of the protection layer.

7. The rechargeable battery of claim 3, wherein the protection layer is formed only on a region except for a region of a bottom surface of the inversion plate having a smaller inner diameter than that of the protrusion part.

8. The rechargeable battery of claim 3, wherein the protection layer is formed on a region of a bottom surface of the inversion plate shaped to correspond to the protrusion part more thickly than in a peripheral region of the region of the bottom surface of the inversion plate.

9. The rechargeable battery of claim 1, wherein the protection layer is formed only on a region except for a central region of a bottom surface of the inversion plate.

* * * * *